US006851863B2

(12) United States Patent
Yokota et al.

(10) Patent No.: US 6,851,863 B2
(45) Date of Patent: Feb. 8, 2005

(54) DOUBLE ROW TAPERED ROLIER BEARING APPARATUS

(75) Inventors: Kunihiko Yokota, Nara (JP); Kanichi Kouda, Osaka (JP)

(73) Assignee: Koyo Seiko Co., Ltd., Osaka (JP)

( * ) Notice: Subject to any disclaimer, the term of this patent is extended or adjusted under 35 U.S.C. 154(b) by 81 days.

(21) Appl. No.: 10/309,003

(22) Filed: Dec. 4, 2002

(65) Prior Publication Data

US 2003/0108261 A1 Jun. 12, 2003

(30) Foreign Application Priority Data

Dec. 7, 2001 (JP) ..................................... P2001-374495
Dec. 28, 2001 (JP) ..................................... P2001-400344

(51) Int. Cl.[7] .............................................. F16C 19/38
(52) U.S. Cl. ........................ 384/473; 384/475; 384/571
(58) Field of Search ................................ 384/473, 475, 384/571, 474, 565

(56) References Cited

U.S. PATENT DOCUMENTS 3,612,631 A    10/1971   O'Connor
4,824,264 A    4/1989   Hoebel
4,952,077 A    8/1990   Kurt
5,660,483 A    8/1997   Mirring et al.
6,293,704 B1   9/2001   Gradu

FOREIGN PATENT DOCUMENTS

DE    2 230 476         1/1974
DE    33 45 721 A1      7/1984
DE    199 35 014 A1     2/2000
EP    0 191 377 A1      1/1986

*Primary Examiner*—Lenard A. Footland
(74) *Attorney, Agent, or Firm*—McGinn & Gibb, PLLC

(57) ABSTRACT

According to this double row tapered roller bearing apparatus, an integral outer ring (2) is provided with oil vents (20) which extend from an inner peripheral face (17) in an area outward in an axial direction than a rolling face (2B) on which an axially outward row of conical rollers (7) rolls and passes through an outer peripheral face (18). Therefore, a portion of lubricating oil supplied from oil supply holes (13) in the integral outer ring (2) passes the oil vents (20) via the axially outward row of the conical rollers (7), and will be returned to a space in a housing (1) by way of a channel (31) in the housing (1). In conclusion, a circulating path of the lubricating oil through the outward row of the conical rollers (7) can be formed by the oil vents (20).

6 Claims, 5 Drawing Sheets

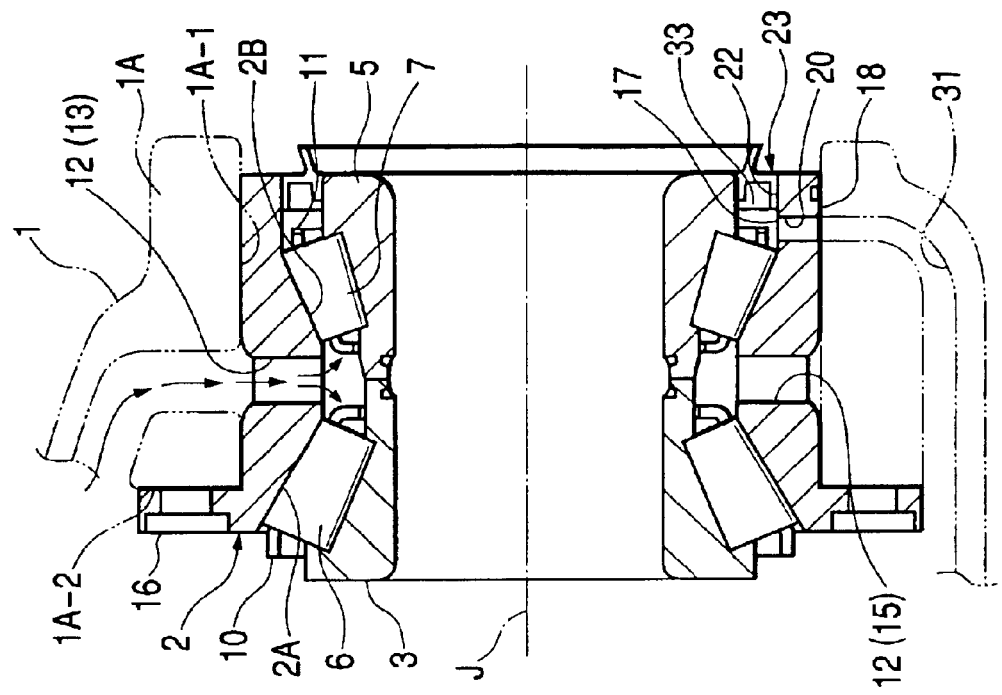
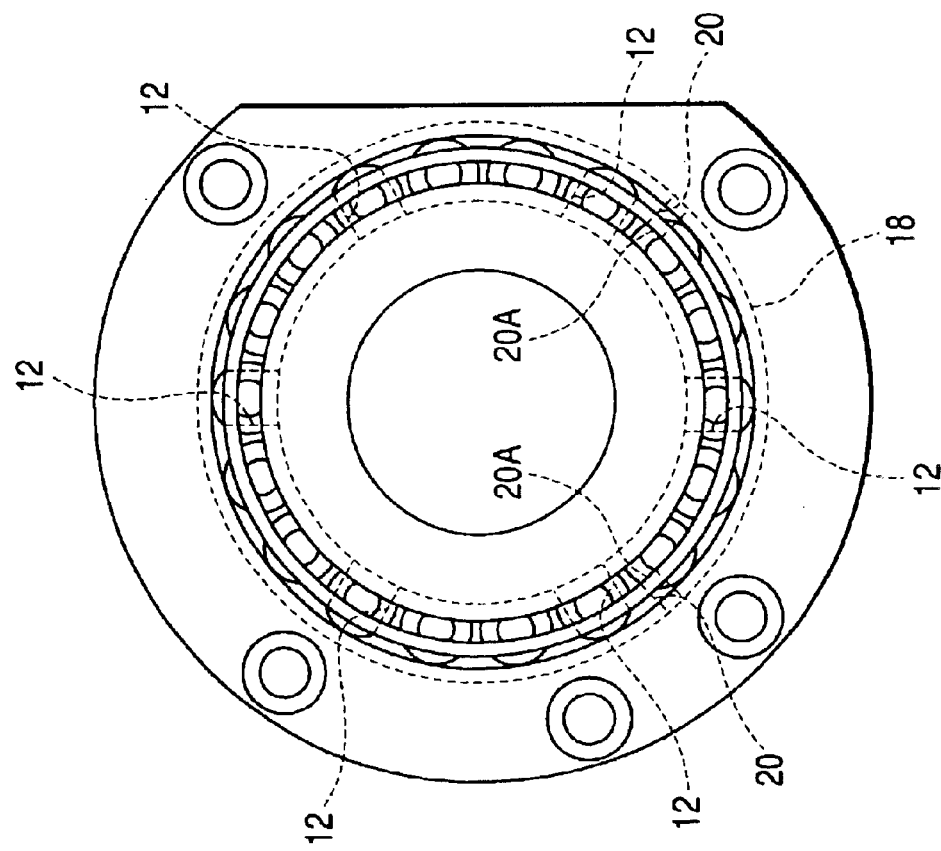

DOUBLE ROW TAPERED ROLLER BEARING APPARATUS

BACKGROUND OF THE INVENTION

The present invention relates to a double row tapered roller bearing apparatus which is adapted to support, for example, a pinion shaft constituting a differential gear for a motor vehicle in a cantilever manner so as to freely rotate in a housing.

Conventionally, there has been proposed a double row tapered roller bearing apparatus of this type as shown in FIG. 5. This double row tapered roller bearing apparatus includes a double row tapered roller bearing 100 adapted to support a pinion shaft 110 having a pinion 122 which is in mesh with a ring gear, in a cantilever manner with respect to a housing 111. This double row tapered roller bearing 100 includes a row of conical rollers 101 located inwardly in an axial direction, and a row of conical rollers 102 located outwardly in an axial direction. The row of the conical rollers 101 is arranged between a first inner ring 103 and a first track face of an integral outer ring 105, while the row of the conical rollers 102 is arranged between a second inner ring 107 and a second track face of the integral outer ring 105. An outer peripheral face of this integral outer ring 105 is engaged with and fixed to an inner peripheral face of an opening in the housing 111, and inner peripheral faces of the first and second inner rings 103, 107 are engaged with and fixed to an outer peripheral face of the pinion shaft 110.

The integral outer ring 105 includes through holes 112 and 113 which extend from its inner peripheral face between the first track face and the second track face and pass through its outer peripheral face. This through hole 112 enables a space in the bearing between the row of the conical rollers 101 and the row of the conical rollers 102 to communicate with an upper space in the housing 111 by way of a channel 123. In the same manner, the through hole 113 enables the space in the bearing to communicate with a lower space in the housing 111 by way of a channel 115 in the housing 111.

A hub 116 is engaged with and fixed to the pinion shaft 110 adjacent to an end face of the second inner ring 107. A seal member 121 is engaged between the hub 116 and the integral outer ring 105.

In this double row tapered roller bearing apparatus, the pinion 122 is caused to rotate with a rotation of the pinion shaft 110 which is pivotally supported by the double row tapered roller bearing 100 with respect to the housing 111, and the ring gear (not shown) which is in mesh with this pinion 122 will rotate.

This rotating ring gear scrapes up lubricating oil which has been stocked at a determined level in the lower space in the housing 111, and supplies the lubricating oil from the upper space into the space in the bearing by way of the channel 123 in the housing 111 and the through hole 112 in the outer ring 105. This lubricating oil supplied into the space in the bearing is then supplied to the row of the conical rollers 101 adjacent to the pinion and the row of the conical rollers 102 adjacent to the opening thereby to lubricate the double row tapered roller bearing 100. This lubricating oil which has been supplied to the double row tapered roller bearing 100 is returned to the lower space by way of the row of the conical rollers 101. Further, the lubricating oil is returned to the lower space by way of the through hole 113 in the integral outer ring 105 and the channel 115 in the housing 111.

By the way, a blind space N is constituted by a combination of an outer peripheral face 107A of a large diameter end of the second inner ring 107, an inner peripheral face 105A of an end part of the integral outer ring 105, and the seal member 121. As the results, a flow of the lubricating oil from the upper through hole 112 to the row of the conical rollers 102 located outwardly in the axial direction is blocked, or the lubricating oil staying in the blind space N is deteriorated, and hence, defective lubrication may occur.

For example, in case where a spread of the lubricating oil from the aforesaid ring gear has been decreased, the supply of the lubricating oil from the upper through hole 112 is decreased, and there is such a probability that a shortage of lubrication may occur at the outward row of the conical rollers 102. Specifically, with respect to the inward row of the conical rollers 101, because a space between the inner ring 103 and the outer ring 105 interposing this inward row of the conical rollers 101 is open toward the space in the housing 111, even though the supply of the lubricating oil to the aforesaid through hole 112 has become poor, the inward row of the conical rollers 101 is easily supplied with the lubricating oil, as compared with the outward row of the conical rollers 102, and a shortage of the lubricating oil will rarely happen. In contrast, the outward row of the conical rollers 102 is likely to be short of the lubricating oil, since a space between the inner ring 107 and the outer ring 105 interposing this outward row of the conical rollers 102 is blocked with the seal member 121. Particularly, in case where the ring gear and the pinion 122 constitute a differential gear for a vehicle, a splash of the lubricating oil by the ring gear may sometimes be lost depending on a posture of the vehicle or a lateral G (an acceleration), and the row of the conical rollers 102 adjacent to the opening may be burned in.

As a double row tapered roller bearing to be incorporated in a bevel gear, for example, and adapted to rotatably support a power transmitting shaft thereof, there has been a type including a single outer ring having two rows of outer ring tracks in a conical shape and integrally formed as a whole. In such a bearing of the type having the integral outer ring, it has been proposed that lubricating oil is supplied to a rolling contact area between the inner and outer ring tracks and the conical rollers by way of a lubricating hole which is provided in a laterally middle part of the above mentioned outer ring.

By the way, in the conventional double row tapered roller bearing as described above, an amount of the lubricating oil to be supplied to an interior of the bearing has been regulated according to a length of the conical rollers and so on. A diameter of a mouth of the above mentioned lubricating hole has been determined on the basis of this amount of the lubricating oil, and the lubricating hole has been formed by drilling work employing a drill or the like. However, in this bearing, as shown in FIG. 6 for example, it has sometimes happened that depending on an interior shape of the bearing, a part of a mouth 51a of a lubricating hole 51 on an inner periphery of an outer ring 50 may intersects an outer ring track 50a which is formed on the outer ring 50. For this reason, in case where burrs or fins have occurred when the lubricating hole 51 is formed by the drilling work, these burrs or fins may sometimes project from the outer ring track 50a, and when the bearing has been assembled, the burrs or fins may be caught between the conical rollers and the outer ring track 50a. As the results, there has arisen such a problem that a surface of the outer ring track 50a may be damaged and life of the bearing may be decreased.

Although there has been an idea of conducting a step for removing the burrs or fins after the above mentioned drilling work, effecting such a removing step will incur a new problem that production steps of the bearing may be increased, which will result in a rise of cost for the bearing.

SUMMARY OF THE INVENTION

In view of the above circumstances, an object of this invention is to provide a double row tapered roller bearing apparatus which can avoid a shortage of lubricant, while maintaining favorable circulation of the lubricant, thus enabling an optimum lubrication to be performed.

Another object of the present invention is to provide a double row tapered roller bearing in which in case where burrs or fins have occurred when forming a lubricating hole, these burrs or fins can be prevented at a low cost from being caught between conical rollers and an outer ring track.

In order to solve the aforesaid object, the invention is characterized by having the following arrangement.

(1) A double row tapered roller bearing apparatus for supporting a rotation shaft in a cantilever manner in an opening of a housing, comprising:

an integral outer ring having double row track faces;

an oil supply hole extending from an outer peripheral face of the integral outer ring and passing through between the double row track faces;

an oil discharge hole extending from the outer peripheral face of the integral outer ring and passing through between the double row track faces; and an oil vent formed in the integral outer ring, the oil bent extending from an inner peripheral face of the integral outer ring in an area outward in an axial direction than a rolling face on which an axially outward row of the conical rollers rolls, and passing through the outer peripheral face of the integral outer ring, wherein the oil vent is formed at a position which are displaced by a determined angle in a circumferential direction from a vertically lower end of the inner peripheral face of the integral outer ring;

a seal member arranged between the integral outer ring and an inner ring in an area outward in the axial direction than the oil vents; and an oil reservoir formed by the seal member and the inner peripheral face of the integral outer ring at a position below the oil vent on the inner peripheral face of the integral outer ring.

(2) The double row tapered roller bearing apparatus according to (1), wherein a plurality of the oil vents are formed in the integral outer ring.

(3) The double row tapered roller bearing apparatus according to (1), wherein a mouth of the oil vent is located above a center of an end face of a roller disposed at a lowest area defined between the outer ring and the inner ring.

(4) A double row tapered roller bearing apparatus comprising:

a single outer ring having a pair of outer ring tracks in a conical shape;

a pair of inner rings having inner ring tracks in a conical shape opposed to the outer ring tracks, respectively;

a plurality of conical rollers interposed between the outer rings tracks and the inner ring tracks opposed thereto, respectively;

a lubricating hole formed through a laterally middle part of an inner periphery of the outer ring;

an intermediate part formed between the outer ring tracks of the outer ring; and a relief portion formed at the intermediate part for preventing a mouth of the lubricating hole from intersecting one of the outer ring tracks, the relief portion being different from the rest of the intermediate part in an inner diameter.

(5) The double row tapered roller bearing apparatus according to (4), wherein a length of the intermediate part in an axial direction is longer than an opening diameter of the mouth of the lubricating hole.

(6) The double row tapered roller bearing apparatus according to (5), wherein the intermediate part includes, a first inner peripheral face which is continued at one end thereof to one of the outer ring tracks and has a small inner diameter, a second inner peripheral face which is continued at one end thereof to the first inner peripheral face, an inner diameter thereof being gradually increased from the one end to the other end, and a third inner peripheral face, as the relief portion, which is continued to the second inner peripheral face and the other outer ring track respectively at one end thereof and the other end has the inner diameter larger than the inner diameter of the first inner peripheral face.

According to the double row tapered roller bearing apparatus of the invention, there is formed, in the integral outer ring, the oil vents extending from the inner peripheral face of the integral outer ring in the area outward in the axial direction than the rolling face on which the axially outward row of the conical rollers rolls, and passing through the outer peripheral face of the integral outer ring.

Therefore, according to the double row tapered roller bearing apparatus of the first aspect of the invention, a portion of the lubricating oil supplied from the oil supply holes in the integral outer ring will pass the oil vents via the axially outward row of the conical rollers, and will be returned to the space in the housing. In this manner, because the circulating path of the lubricating oil through the outward row of the conical rollers can be formed by the oil vents, the flow of the lubricant to the outward row of the conical rollers will be promoted. Thus, an anxiety of defective lubrication can be eliminated, and burning in of the outward row of the conical rollers can be prevented before it happens.

According to this double row tapered roller bearing apparatus of the invention, there is formed the oil reservoir by means of the seal member which is arranged between the integral outer ring and the inner ring in the area outward in the axial direction than the oil vents, which are formed at the positions displaced by a determined angle in a circumferential direction from the vertically lower end of the inner peripheral face of the integral outer ring, in combination with the inner peripheral face of the integral outer ring, at the position below the oil vents on the inner peripheral face of the integral outer ring.

According to this invention, the lubricating oil is supplied from the upper space in the housing to the oil supply hole which are formed in the integral outer ring, and this lubrication oil is supplied to the double row of the conical rollers which are arranged between the integral outer ring and the inner rings.

The lubricating oil supplied to the axially outward row of the conical rollers of the double row of the conical rollers will lubricate the track faces of the integral outer ring and the inner ring on which the row of the conical rollers rolls, and will arrive at the oil reservoir by way of the row of the conical rollers. When the lubricating oil stocked in this reservoir has reached the oil vents, this lubricating oil will be discharged from the oil vents to the outer peripheral face of the integral outer ring, and will be returned to the lower space in the housing.

According to this invention, even in case where the supply of the lubricating oil to the oil supply holes has become poor, the axially outward row of the conical rollers can be lubricated with the lubricating oil stocked in the reservoir. In conclusion, according to this double row tapered roller bearing apparatus of this invention, a shortage of the lubricant can be avoided by the oil reservoir, while maintaining the circulation of the lubricant by means of the oil vents, and the optimum lubrication can be realized.

It is to be noted that the lubricating oil which has been supplied to the axially inward row of the conical rollers of the double row conical rollers than the axially outward row of the conical rollers will lubricate the track faces of the integral outer ring and the inner ring, and pass this row of the conical rollers to be returned to the lower space in the housing from the position between the integral outer ring and the inner ring.

In the double row tapered roller bearing having a structure according to the invention, the intermediate part is formed between the outer ring tracks, and the intermediate part is provided with the relief portion for preventing the mouth of the lubricating hole on the inner periphery of the outer ring from intersecting the outer ring tracks. In this manner, even in case where burrs or fins may occur at the mouth of the inner periphery of the outer ring when the lubricating hole is formed, the burrs or fins which have occurred can be prevented from projecting over the outer ring track across this relief portion.

BRIEF DESCRIPTION OF THE DRAWINGS

FIG. 1A is a plan view of an embodiment of a double row tapered roller bearing apparatus according to this invention, and FIG. 1B is a sectional view of the embodiment.

DETAILED DESCRIPTION OF PREFERRED EMBODIMENTS

Figure 2:
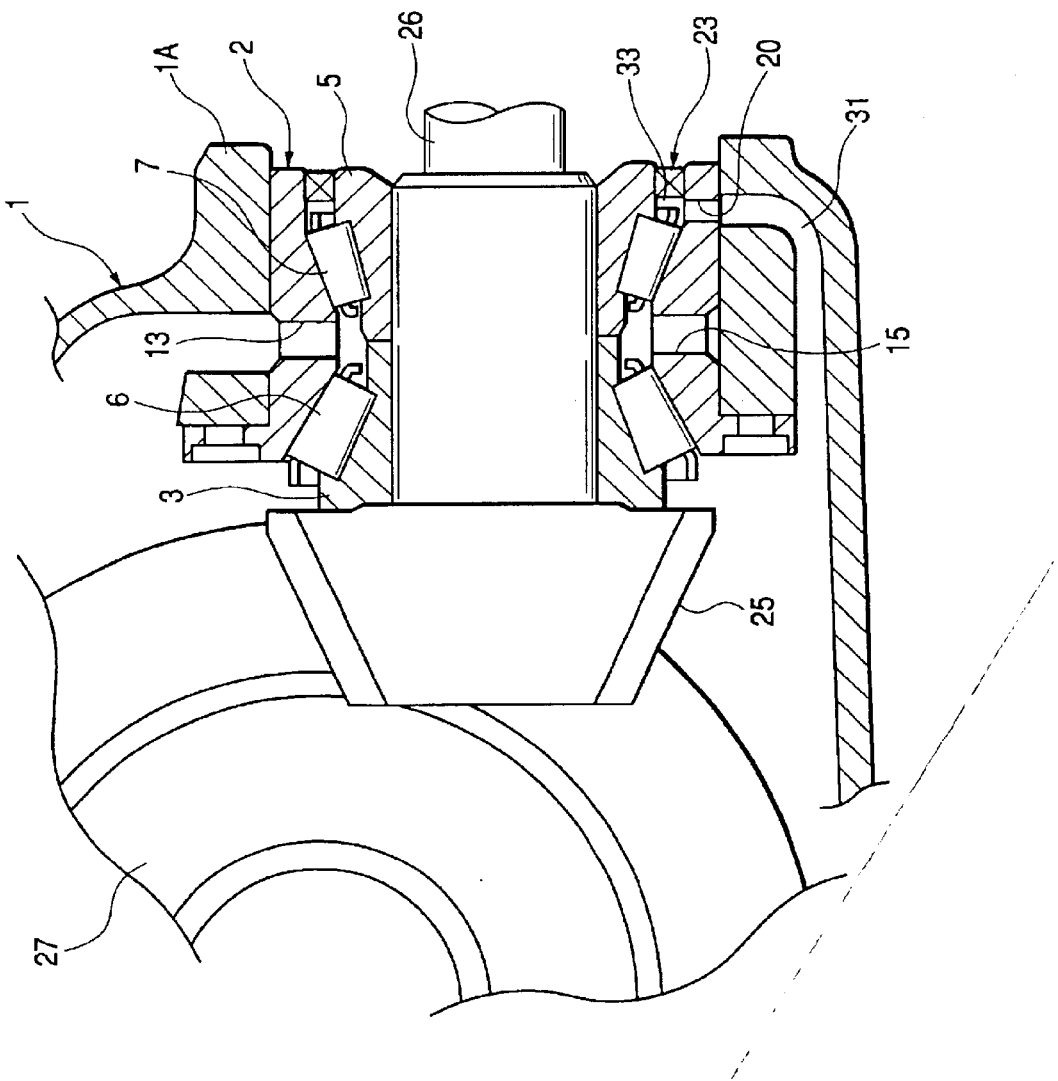
FIG. 2 is a sectional view of a differential gear having the embodiment showing an essential part thereof.

Now, this invention will be described in detail by way of an embodiment as shown in the drawings.

First Embodiment

FIG. 1A shows in section a first embodiment of the double row tapered roller bearing apparatus according to this invention. This embodiment includes an integral outer ring 2 which is pressure fitted to an inner peripheral face 1A-1 of an opening 1A in a housing 1, an inward inner ring 3 which is arranged so as to be opposed to an inward track face 2A of the integral outer ring 2, and an outward inner ring 5 which is arranged so as to be opposed to an outward track face 2B of the integral outer ring 2. This embodiment further includes an inward row of conical rollers 6 which is arranged between the inward track face 2A of the integral outer ring 2 and the inward inner ring 3, and an outward row of conical rollers 7 which is arranged between the outward track face 2B of the integral outer ring 2 and the outward inner ring 5. The inward row of the conical rollers 6 is engaged with an annular cage 10, and the outward row of the conical rollers 7 is engaged with an annular cage 11.

The integral outer ring 2 has through holes 12 respectively extending from its inner peripheral face between the inward track face 2A and the outward track face 2B and passing through its outer peripheral face. These through holes 12 are formed by six at a determined space in a circumferential direction as shown in FIG. 1A. For example, of these six through holes 12, those through holes 12 located above a rotation center axis J function as oil supply holes 13, while those through holes 12 located below the rotation center axis J function as oil discharge holes 15.

The aforesaid integral outer ring 2 has a mounting flange 16 at its axially inward end. This mounting flange 16 is in tight contact with an end face 1A-2 of the opening 1A in the housing 1, and fixed by means of a bolt (not shown).

The aforesaid integral outer ring 2 includes oil vents 20 respectively extending from its inner peripheral face 17 in an area outward than the outward track face 2B and passing through its outer peripheral face 18. These oil vents 20 are formed at two positions which are displaced by a determined angle in a circumferential direction from the lowest point on the integral outer ring 2, as shown in FIG. 1A. A seal member 23 is provided between an inner peripheral face 22 of the integral outer ring 2 in an area outward than the oil vents 20, and the aforesaid outward inner ring 5. This seal member 23 is fixed to the inner peripheral face 22 of the integral outer ring 2.

The seal member 23 which is arranged between the integral outer ring 2 and the inner ring 5 in an area axially outward than these oil vents 20, 20 forms an oil reservoir 33 in combination with the inner peripheral face 17 at a position below the oil vents 20 on the inner peripheral face 17 of the integral outer ring 2. A mouth 20A of each of these oil vents 20 at an inner peripheral side is located above a center of a large diameter end face of the lowest roller of the outward row of the conical roller 7.

In this embodiment, a pinion shaft 26 having a pinion 25 at its one end is pressure fitted to the inner peripheral faces of the inner rings 3, 5 to be fixed thereto, as shown in FIG. 2. The pinion 25 is in mesh with a ring gear 27, and thus, this double row tapered roller bearing apparatus constitutes, for example, a differential gear for a vehicle.

According to the double row tapered roller bearing apparatus having the above described structure, the integral outer ring 2 is provided with the oil vents 20 which extend from the inner peripheral face 17 in the area outward in the axial direction than the rolling face 2B on which the axially outward row of the conical rollers 7 in the housing 1 rolls and pass through the outer peripheral face 18. Therefore, according to this double row tapered roller bearing apparatus, a portion of the lubricating oil supplied from the oil supply holes 13 in the integral outer ring 2 passes the oil vents 20 via the axially outward row of the conical rollers 7, and will be returned to the space in the housing 1 by way of a channel 31 in the housing 1. In this manner, because a circulating path of the lubricating oil through the outward row of the conical rollers 7 can be formed by the oil vents 20, a flow of the lubricant to the outward row of the conical rollers 7 can be promoted. Thus, an anxiety of defective lubrication can be eliminated, and burning in of the outward row of the conical rollers 7 can be prevented before it happens.

Further, according to the double row tapered roller bearing apparatus in this embodiment, the lubricating oil supplied to the outward row of the conical rollers 7 will lubricate the track faces of the integral outer ring 2 and the inner ring 5 on which the outward row of the conical rollers 7 rolls, and will arrive at the oil reservoir 33 by way of the outward row of the conical rollers 7. When the lubricating oil stocked in this reservoir 33 has reached the oil vents 20, this lubricating oil will be discharged from the oil vents 20 to the outer periphery of the integral outer ring 2, and will be returned to the lower space by way of the channel 31 in the housing 1.

As the results, according to this embodiment, even in case where the supply of the lubricating oil has become poor, the outward row of the conical rollers 7 can be lubricated with the lubricating oil stocked in the reservoir 33. In conclusion, according to this double row tapered roller bearing apparatus, a shortage of the lubricant can be avoided by the oil reservoir 33, while maintaining the circulation of the lubricant by the presence of the oil vents 20, and the optimum lubrication can be realized.

Because the mouth 20A at the inner peripheral side of each of the oil vents 20 is located above the center of the large diameter end face of the lowest conical roller of the outward row of the conical rollers 7, it will be assured that the row of the conical rollers 7 can be lubricated with the lubricating oil stocked in the reservoir 33.

The lubricating oil supplied to the axially inward row of the conical rollers 6 will lubricate the track faces of the integral outer ring 2 and the inner ring 3 on which the row of the conical rollers 6 rolls, and will be returned into the housing 1 by way of this row of the conical rollers 6 from a position between the integral outer ring 2 and the inner ring 3. The lubricating oil overflowed from the space between the rows of the conical rollers 6 and 7 which are arranged between the integral outer ring 2 and the inner rings 3, 5 will be discharged from the oil discharge holes 15 of the through holes 12 which are located below the rotation center line J.

As apparent from the foregoing, according to the double row tapered roller bearing apparatus of the invention, the integral outer ring is provided with the oil vents which extend from the inner peripheral face in the area outward in the axial direction than the rolling face on which the axially outward row of the conical rollers rolls and pass through the outer peripheral face. Therefore, according to the double row tapered roller bearing apparatus according to the invention, a portion of the lubricating oil supplied from the oil supply holes in the integral outer ring will pass the oil vents via the axially outward row of the conical rollers, and will be returned to the space in the housing. In this manner, because the circulating path of the lubricating oil through the outward row of the conical rollers can be formed by the oil vents, the flow of the lubricant to the outward row of the conical rollers will be promoted. Thus, an anxiety of defective lubrication can be eliminated, and burning in of the outward row of the conical rollers can be prevented before it happens.

Moreover, according to the double row tapered roller bearing apparatus of the invention, there is formed an oil reservoir by means of the seal member which is arranged between the integral outer ring and the inner ring in the area outward in the axial direction than the oil vents, which are formed at the positions displaced by a determined angle in a circumferential direction from the vertically lower end of the inner peripheral face of the integral outer ring, in combination with the inner peripheral face of the integral outer ring, at the position below the oil vents on the inner peripheral face of the integral outer ring. According to this invention, the lubricating oil is supplied from the upper space in the housing to the oil supply hole which are formed in the integral outer ring, and this lubrication oil is supplied to the double row conical rollers which are arranged between the integral outer ring and the inner rings.

The lubricating oil supplied to the outward row of the conical rollers will lubricate the track faces of the integral outer ring and the inner ring on which the row of the conical rollers rolls, and will arrive at the oil reservoir by way of the row of the conical rollers. When the lubricating oil stocked in this reservoir has reached the oil vents, this lubricating oil will be discharged from the oil vents to the outer peripheral face of the integral outer ring, and will be returned to the lower space in the housing.

According to this invention, even in case where the supply of the lubricating oil has become poor, the outward row of the conical rollers can be lubricated with the lubricating oil stocked in the reservoir. In conclusion, according to this double row tapered roller bearing apparatus of this invention, a shortage of the lubricant can be avoided by the oil reservoir, while maintaining the circulation of the lubricant by the presence of the oil vents, and the optimum lubrication can be realized.

Second Embodiment

Figure 3:
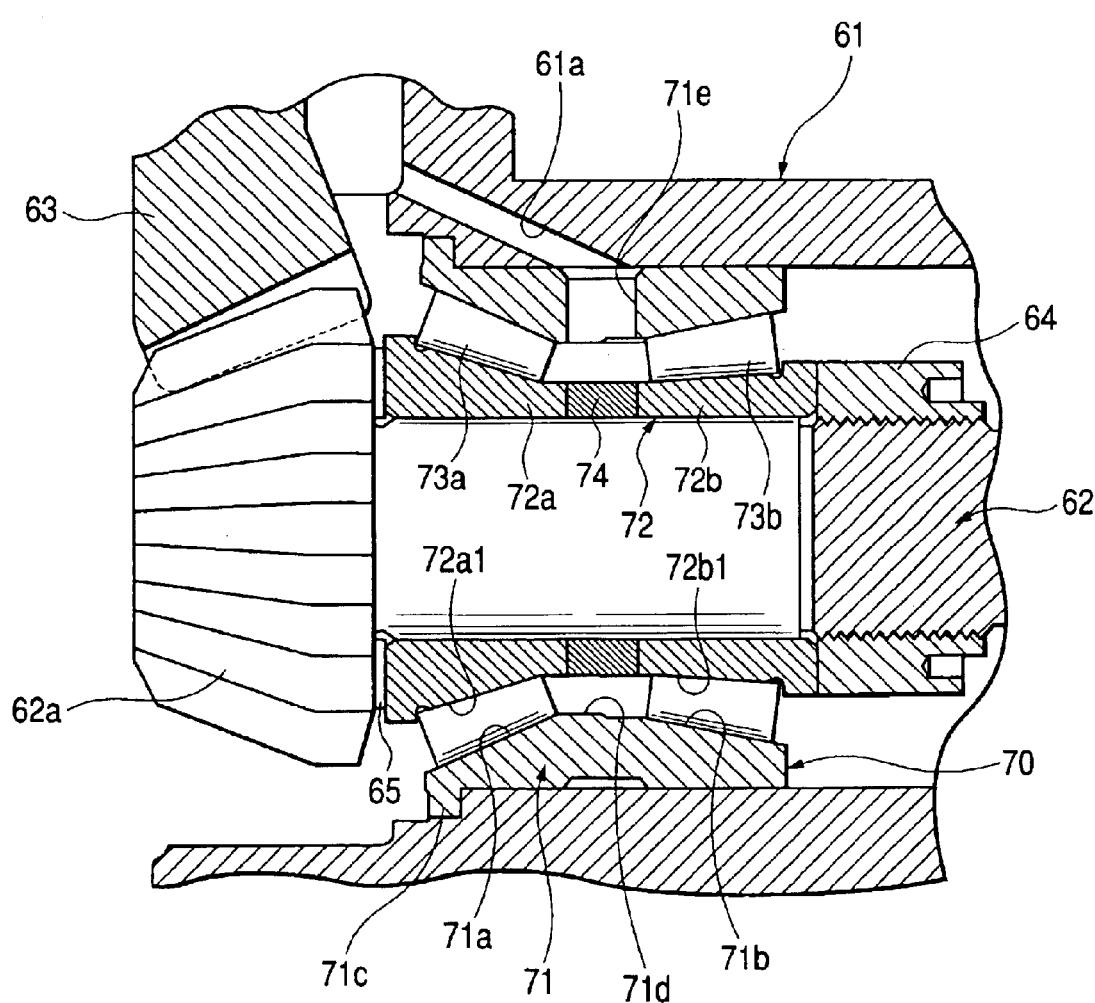
FIG. 3 is a sectional view of a bevel gear assembly employing a double row tapered roller bearing according to an embodiment of the present invention.

FIG. 3 is a sectional view showing a bevel gear assembly employing the double row tapered roller bearing according to an embodiment of the present invention. In the drawing, a bevel small gear shaft 62 provided with a bevel small gear 62a at its one end (a leftward end in the drawing) is rotatably supported in a housing 61 by a double row tapered roller bearing 70 of this invention. A bevel gear 63 is connected to the bevel small gear 62a so that a power is transmitted between this bevel gear 63 and the bevel small gear shaft 62.

The double row tapered roller bearing 70 includes: a single outer ring 71 having a pair of conical outer ring tracks 71a, 71b on its inner periphery and integrally formed as a whole; a pair of inner rings 72a, 72b which are provided on its outer periphery with conical inner ring tracks 72a1, 72b1 respectively opposed to the outer ring tracks 71a, 71b; a plurality of conical rollers 73a, 73b as rolling bodies which are respectively interposed between the outer ring tracks 71a, 71b and the inner ring tracks 72a1, 72b1 opposed to each other; and an inner ring interim seat 74 which is interposed between the pair of the inner rings 72a and 72b. The outer ring 71 is fixed to the housing 61 with its flange portion 71c provided at its one end in an axial direction fixed by a bolt (not shown) The inner rings 72a, 72b and the inner ring interim seat 74 are mounted to the bevel small gear shaft 62 by a nut 64 in a state where they are tightened leftward in the drawing, so that the bearing 70 supports the bevel small gear shaft 62 under a determined pre-load. A ring-like spacer 65 is disposed between the bevel small gear 62a and an end face in an axial direction of the inner ring 72a.

The outer ring 71 includes an intermediate part 71d having different inner diameters, between the outer ring tracks 71a and 71b. There is formed a lubricating hole 71e of which one of mouths (on the inner periphery of the outer ring) is formed in this intermediate part 71d. This lubricating hole 71e is formed by drilling employing a drill or the like so as to allow an interior of the outer ring 71 to communicate with the exterior, and connected to a supply hole 61a which is provided in the housing 61. Then, by way of this supply hole 61a and the lubricating hole 71e, the lubricating oil is supplied to a rolling contact area between the outer ring tracks 71a, 71b and the inner ring tracks 72a1, 72b1 corresponding to the conical rollers 73a, 73b.

Figure 4A:
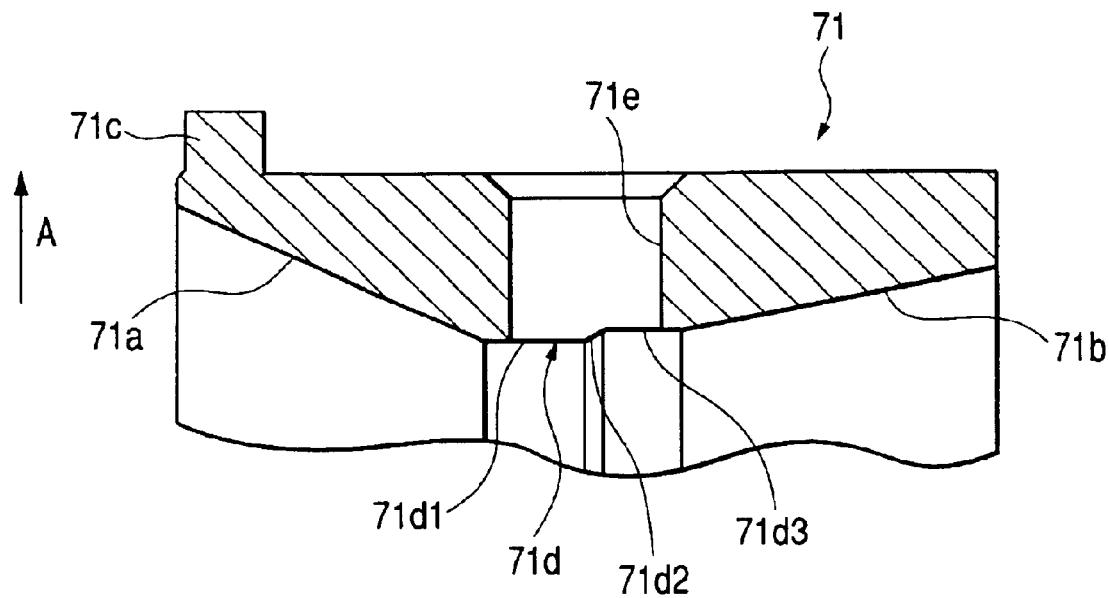
FIG. 4A is an enlarged sectional view showing a structure in vicinity of a lubricating hole formed in an outer ring as shown in FIG. 3, and 4B is a structural view showing the structure in vicinity of the lubricating hole as seen in a direction of an arrow A in FIG. 4A.
Figure 4B:
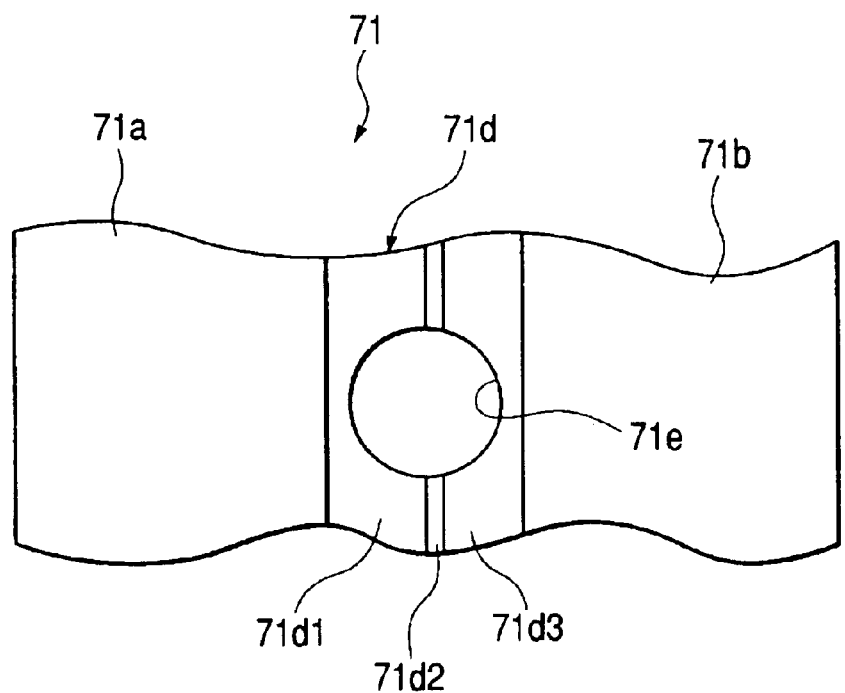
Figure 5:
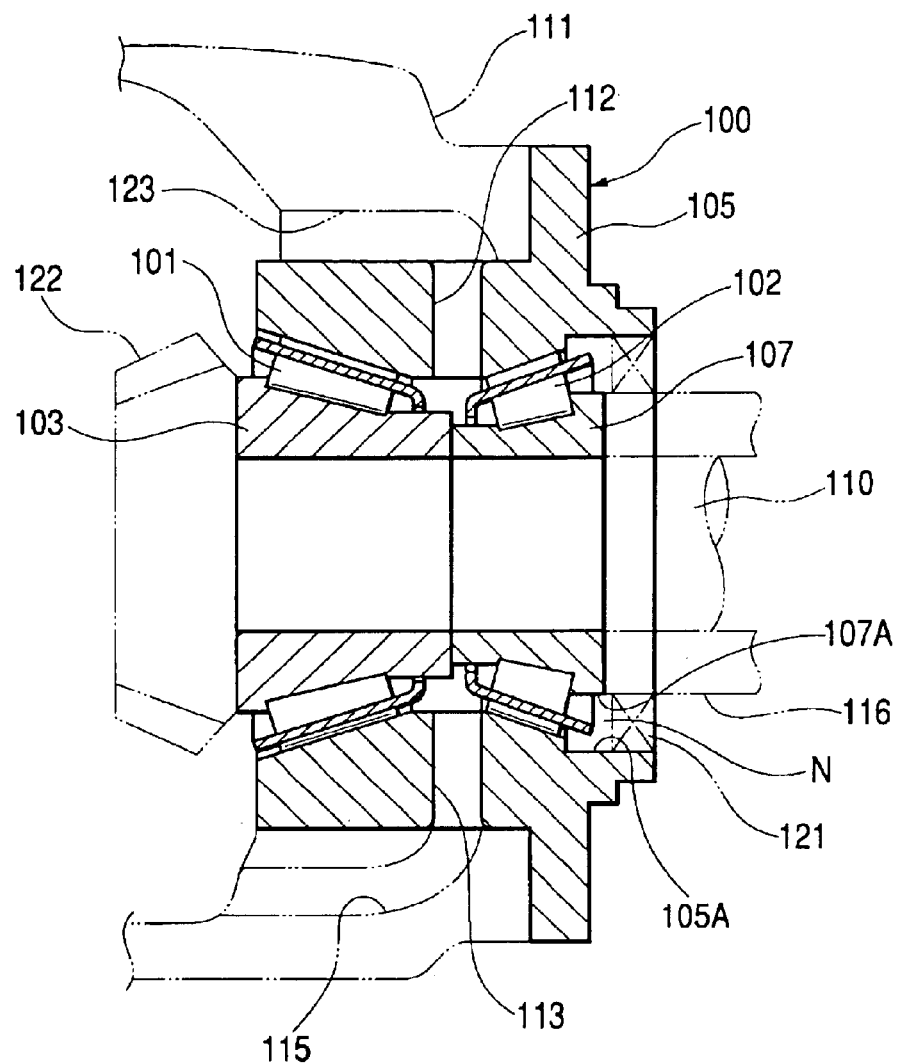
FIG. 5 is a sectional view of a conventional double row tapered roller bearing apparatus.

Referring to both FIGS. 4A and 4B, as a length of the intermediate part 71d in an axial direction, a value larger than an opening diameter of the mouth of the lubricating hole 71e on the inner periphery of the outer ring is selected. This intermediate part 71d includes a first inner peripheral face 71d1 which is continued at its one end to the outer ring track 71a and has the smallest inner diameter, a second inner peripheral face 71d2 which is continued at its one end to the first inner peripheral face 71d1 and its inner diameter is gradually increased from the one end to the other end having a tapered shape in section, and a third inner peripheral face 71d3 which is continued to the second inner peripheral face 71d2 and the outer ring track 71b respectively at its one end and at the other end, and has the largest inner diameter. This third inner peripheral face 71d3 constitutes a relief portion for preventing the mouth of the lubricating hole 71e on the inner periphery of the outer ring from intersecting the outer ring track 71b. Even in case where burrs or fins have occurred at the mouth of the inner periphery of the outer ring when the lubricating hole 71e has been formed by the drilling work, the burrs or fins can be prevented from projecting over the outer ring track 71b across this third inner peripheral face 71d3.

Figure 6:
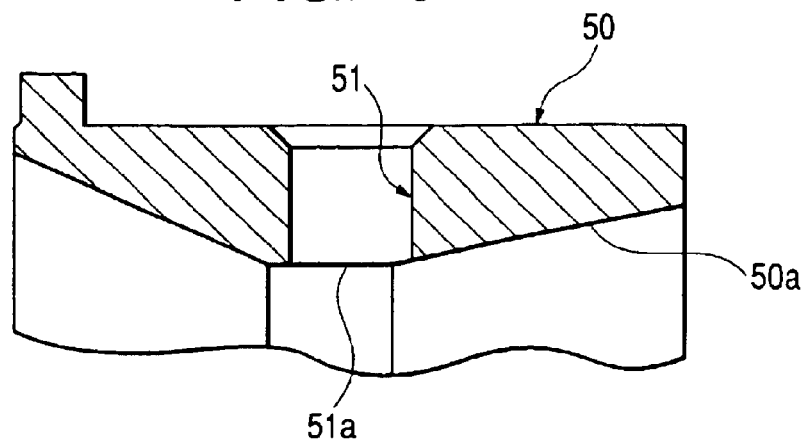
FIG. 6 is an explanatory view showing a problem in a conventional double row tapered roller bearing.

In the double row tapered roller bearing 70 having a structure as described above, even in case where burrs or fins have occurred at the mouth of the inner periphery of the outer ring when the lubricating hole 71e has been formed, the burrs or fins can be prevented from projecting over the outer ring track 71b across the third inner peripheral face 71d3. Accordingly, in contrast with the conventional case as shown in FIG. 6, the burrs or fin can be prevented from being caught between the outer ring track 71b and the conical roller 73b, and a surface of the outer ring track 71b and a surface of the conical roller 13b can be prevented from being damaged. Consequently, the life of the bearing 70 can be prolonged. Moreover, even when the burrs or fins have occurred, these burrs or fins will not be caught between the outer ring track 71b and the conical roller 73b, and there will be no need of removing these burrs or fins. Therefore, a removing step of the burrs or fins will not be required, and the production cost for the bearing 70 can be depressed. Further, since the burrs or fins can be prevented from being caught between the outer ring track 71b and the conical roller 73b, an occurrence of defective rolling of the conical roller 73b or abnormal noise resulting from this defective rolling can be prevented.

Although in the above description, there has been described the structure for preventing one of the outer ring tracks 71b from intersecting the mouth on the inner periphery of the outer ring by the relief portion, it would be possible to provide another relief portion for preventing the other outer ring track 71a from intersecting the mouth on the inner periphery of the outer ring on the intermediate part 71d.

As described above, according to the double row tapered roller bearing of this invention, even in case where burrs or fins have occurred at the mouth of the inner periphery of the outer ring along with formation of the lubricating hole, the burrs or fins which have occurred can be prevented from projecting over the outer ring track, and these burrs or fins need not be removed. As the results, catch of the burrs or fins between the conical roller and the outer ring track can be prevented at a low cost. Because the catch of the burrs or fins between the conical roller and the outer ring track can be prevented, the surface of the outer ring track will be prevented from being damaged, and therefore, the life of the bearing can be prolonged.

What is claimed is:

1. A double row tapered roller bearing apparatus for supporting a rotation shaft in a cantilever manner in an opening of a housing, comprising:

an integral outer ring having double row track faces;

an oil supply hole extending from an outer peripheral face of the integral outer ring and passing through between the double row track faces;

an oil discharge hole extending from the outer peripheral face of the integral outer ring and passing through between the double row track faces; and an oil vent formed in the integral outer ring, the oil vent extending from an inner peripheral face of the integral outer ring in an area outward in an axial direction than a rolling face on which an axially outward row of the conical rollers rolls, and passing through the outer peripheral face of the integral outer ring, wherein the oil vent is formed at a position which is displaced by a determined angle in a circumferential direction from a vertically lower end of the inner peripheral face of the integral outer ring;

a seal member arranged between the integral outer ring and an inner ring in an area outward in the axial direction than the oil vents; and an oil reservoir formed by the seal member and the inner peripheral face of the integral outer ring at a position below the oil vent on the inner peripheral face of the integral outer ring.

2. The double row tapered roller bearing apparatus according to claim 1, wherein a plurality of the oil vents are formed in the integral outer ring.

3. The double row tapered roller bearing apparatus according to claim 1, wherein a mouth of the oil vent is located above a center of an end face of a roller disposed at a lowest area defined between the outer ring and the inner ring.

4. A double row tapered roller bearing apparatus comprising:

a single outer ring having a pair of outer ring tracks in a conical shape;

a pair of inner rings having inner ring tracks in a conical shape opposed to the outer ring tracks, respectively;

a plurality of conical rollers interposed between the outer rings tracks and the inner ring tracks opposed thereto, respectively;

a lubricating hole formed through a laterally middle part of an inner periphery of the outer ring;

an intermediate part formed between the outer ring tracks of the outer ring; and a relief portion formed at the intermediate part for preventing a mouth of the lubricating hole from intersecting one of the outer ring tracks, the relief portion being different from the rest of the intermediate part in an inner diameter.

5. The double row tapered roller bearing apparatus according to claim 4, wherein a length of the intermediate part in an axial direction is longer than an opening diameter of the mouth of the lubricating hole.

6. The double row tapered roller bearing apparatus according to claim 5, wherein the intermediate part includes, a first inner peripheral face which is continued at one end thereof to one of the outer ring tracks and has a small inner diameter, a second inner peripheral face which is continued at one end thereof to the first inner peripheral face, an inner diameter thereof being gradually increased from the one end to the other end, and a third inner peripheral face, as the relief portion, which is continued to the second inner peripheral face and the other outer ring track respectively at one end thereof and the other end has the inner diameter larger than the inner diameter of the first inner peripheral face.

* * * * *